United States Patent [19]

Chiba Nobuhiro

[11] Patent Number: 5,043,830
[45] Date of Patent: Aug. 27, 1991

[54] SYSTEM FOR RECORDING AND REPRODUCING DIGITAL AUDIO SIGNAL

[75] Inventor: Chiba Nobuhiro, Kanagawa, Japan

[73] Assignee: Sony Corporation, Tokyo, Japan

[21] Appl. No.: 326,632

[22] Filed: Mar. 21, 1989

[30] Foreign Application Priority Data

Mar. 29, 1988 [JP] Japan .................................. 63-77546

[51] Int. Cl.$^5$ .............................................. H04N 5/78
[52] U.S. Cl. ..................................... 360/19.1; 360/39; 358/341; 371/35.1
[58] Field of Search ................ 360/19.1, 39; 371/38.1, 371/39.1, 40.1; 358/341

[56] References Cited

U.S. PATENT DOCUMENTS

| | | | |
|---|---|---|---|
| 4,329,708 | 5/1982 | Yamamoto ....................... | 358/310 X |
| 4,772,960 | 9/1988 | Takohoshi et al. ............ | 360/19.1 X |
| 4,796,243 | 1/1989 | Kato ............................... | 360/36.2 X |
| 4,849,833 | 7/1989 | Yoshimura ..................... | 360/36.2 X |
| 4,914,527 | 4/1990 | Asai et al. ...................... | 360/19.1 X |

*Primary Examiner*—Robert L. Richardson
*Assistant Examiner*—Hung H. Bui

*Attorney, Agent, or Firm*—Alvin Sinderbrand; William S. Frommer

[57] ABSTRACT

A system is provided for reproducing digital audio data from a recording medium on which segments of digital audio data are recorded with video data, with three segments of the digital audio data corresponding to one field of the video data, each segment including plural samples of the digital audio data, the number of the samples in four out of every five fields being different from that of remaining one of such five fields, and each segment further including identification data indicating field numbers to which each segment belongs. The system detects the identification data in each segment of the digital audio data and whether or not an error appears in the identification data, whereupon, numbering data 1 through 15 ($=3\times5$) are derived from the identification data for indicating the phase of each segment in a set corresponding to the periods of the 5 fields. The numbering data derived from the identification data is loaded into a counter when no error is detected in the identification data and, when an error is detected in the identification data, the counter counts a clock signal having a period corresponding to one segment. The digital audio data is reconstructed according to the output of the counter.

12 Claims, 5 Drawing Sheets

| Tracks \ Audio areas | ARA 1 | ARA 2 | ARA 3 | ARA 4 |
|---|---|---|---|---|
| ⋮ | ⋮ | ⋮ | ⋮ | ⋮ |
| T1A-1 | --- | --- | CH3a | CH4a |
| T2B-1 | --- | --- | CH1a | CH2a |
| T3A-1 | CH1a | CH2a | CH3b | CH4b |
| T4B-1 | CH3a | CH4a | CH1b | CH2b |
| T5A-1 | CH1b | CH2b | CH3c | CH4c |
| T6B-1 | CH3b | CH4b | CH1c | CH2c |
| T1A-2 | CH1c | CH2c | --- | --- |
| T2B-2 | CH3c | CH4c | --- | --- |
| ⋮ | ⋮ | ⋮ | ⋮ | ⋮ |

FIG.7

| Address in ROM | | Contents of ROM |
|---|---|---|
| Field $IDF_{ID}$ | Segment $IDS_{ID}$ | Numbering data |
| 0  0  0 | 0  0 | 0  0  0  0 |
| 0  0  0 | 0  1 | 0  0  0  1 |
| 0  0  0 | 1  0 | 0  0  1  0 |
| 0  0  1 | 0  0 | 0  0  1  1 |
| 0  0  1 | 0  1 | 0  1  0  0 |
| 0  0  1 | 1  0 | 0  1  0  1 |
| 0  1  0 | 0  0 | 0  1  1  0 |
| 0  1  0 | 0  1 | 0  1  1  1 |
| 0  1  0 | 1  0 | 1  0  0  0 |
| 0  1  1 | 0  0 | 1  0  0  1 |
| 0  1  1 | 0  1 | 1  0  1  0 |
| 0  1  1 | 1  0 | 1  0  1  1 |
| 1  0  0 | 0  0 | 1  1  0  0 |
| 1  0  0 | 0  1 | 1  1  0  1 |
| 1  0  0 | 1  0 | 1  1  1  0 |

# SYSTEM FOR RECORDING AND REPRODUCING DIGITAL AUDIO SIGNAL

BACKGROUND OF THE INVENTION

1. Field of the Invention

The present invention relates to a system for recording and reproducing a digital audio signal suitable for use, for example, in a digital video tape recorder (D-VTR).

2. Description of the Prior Art

A digital video tape recorder (D-VTR) has been proposed which converts a video signal and audio signal into digital signals and, when necessary, compresses the signals along the time base. The processed video signal and audio signal then are sequentially recorded as digital video data and digital audio data by means of rotary heads helically scanning a magnetic tape along recording tracks angled with respect to the longitudinal direction of the tape. The original signals then may be reproduced from the recording tracks.

In such a D-VTR, the sampling frequency of the audio signal is set for example to 48 kHz in accordance with standards for interfacing with other audio equipment and therefore one field of the video signal using the NTSC system of standards, has a frequency of 60/1.001 (=59.94) Hz. Hence, the number of samples in one field becomes 48 kHz/59.94 Hz=800.8. Note that such number is not an integer.

In practice the number of samples of the audio data recorded in one field period is set to 801 samples for the 1st to 4th fields and is set to 800 samples for the 5th field. Thus, 4004 samples are recorded during every 5-field period with such a period treated as a cyclic set of periods.

To reproduce an audio signal so recorded, the number of samples of the audio data included in each field is identified. A way to record identification flags with digital audio data is proposed for identifying each field having 800 samples and each field having 801 samples. At the time of reproduction, the identification flag is referred to so that the number of output samples of the digital audio data is controlled. A problem with such a reproducing circuit system in a D-VTR, however, is that an error occurring in the identification flag makes the control of the number of output samples of the digital audio data impossible.

OBJECTS AND SUMMARY OF THE INVENTION

An object of the present invention is to propose a new digital audio signal recording/reproducing system in which the above mentioned problem is solved.

Another object of the present invention is to propose a digital audio signal recording/reproducing system capable of recording sampled digital audio data with a video signal on a recording medium and, at the time of reproduction, identifying the number of samples of digital audio data within each field, thereby controlling the number of output samples.

A further object of the present invention is to propose a digital audio signal reproducing system in which the number of output samples of digital audio data can be controlled without using a sample number identification flag.

These and other objects of the invention are provided by a system in which a PCM audio signal is provided by digitizing an audio signal according to a sampling frequency in a specific relationship with the unit period of a video signal, dividing the digitized signal into specific plural blocks and encoding each block for error correction. Identification information for identifying the specific block and a synchronization signal are attached to each block, which then are recorded on a recording medium. For reproducing the PCM audio signal on a recording medium, the PCM audio signal is decoded by means of a decoder to perform error correction, then reconstructed by means of a memory means. Numbering data corresponding to each block of the plural blocks is synchronized at a predetermined period to the field period of the video signal. When the reproduced identification signal is correct the numbering data and the sampling frequency of the audio signal are delivered based on the identification signal to a counting circuit as preset data. When an error is detected in the reproduced identification signal, the preset data is inhibited from being loaded into the counting circuit. A clock having a period corresponding to the block of the digital audio signal, however, is counted up to a maximum of the number of the plural blocks. As a result, the phase of each of the plural blocks can be correctly detected based on the count output obtained from the counting circuit because the blocks are synchronized with the sampling frequency. Thus, the number of the samples of original digital audio signal taken out of the memory means can be controlled to be in accordance with the number of samples in each block of the plural blocks.

BRIEF DESCRIPTION OF THE DRAWINGS

FIG. 7 is a table used for explaining the operation of a numbering data generator according to the invention.

DETAILED DESCRIPTION OF THE PREFERRED EMBODIMENTS

A digital VTR (D-VTR) for recording a digital audio signal with a video signal to which the invention is applied is described below with reference to the drawings.

Figure 1:
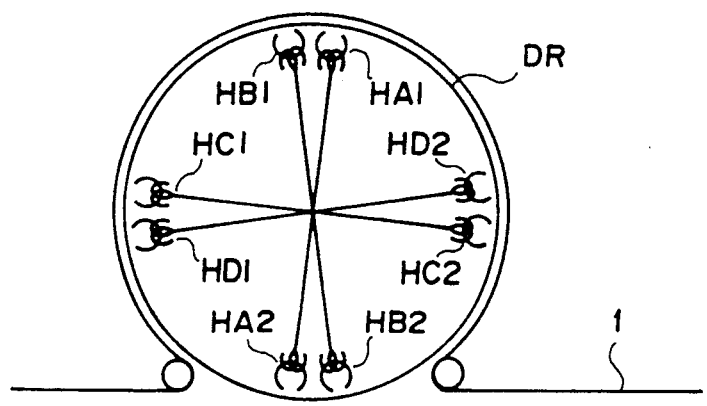
FIG. 1 shows an example of an arrangement of recording and playback heads in a digital VTR to which this invention is applied.

Referring to FIG. 1, digital video data and digital audio data are recorded and reproduced on a magnetic tape 1 using a rotary magnetic head JK formed of a rotary drum DR. The drum DR has two pairs of recording heads HA1, HB1 and HA2, HB2, and two pairs of playback heads HC1, HD1 and HC2, HD2. The playback heads cross the recording heads at right angles as shown in FIG. 1.

The recording heads HA1, HA2, are spaced one track width apart from the recording heads HB1, HB2, respectively, in the direction of their height. Similarly, the playback heads HC1, HD1 are spaced one track width apart from the playback heads HC2, HD2, respectively. The tape traveling speed and the rotary drum rotating speed are set such that, for example in the NTSC system, the digital video data for one field is recorded and reproduced while the rotating drum DR makes one and half rotations.

Figure 2:
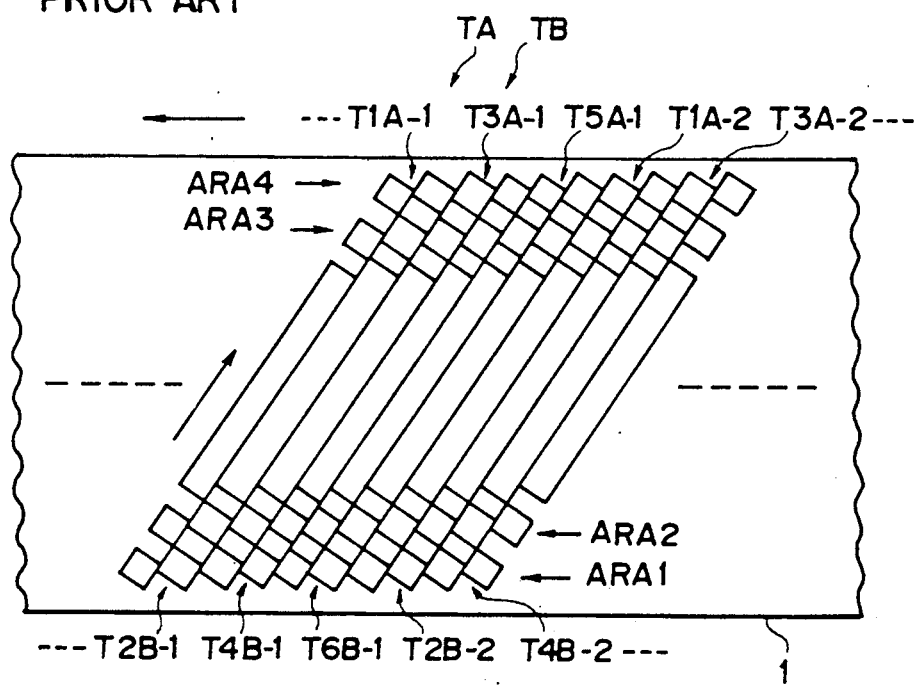
FIG. 2 shows a track pattern recorded by the heads shown in FIG. 1.

Referring to FIGS. 1 and 2, the magnetic tapes moves over the recording heads as the drum rotates so that each head follows a recording track. A pair of recording heads HA1, HB1 (HA2, HB2) follow a pair of recording tracks (hereinafter to be called a "segment") which are oriented at positive and negative azimuth angles. (Hereinafter, the recording track with a positive azimuth angle will be called "recording track A" or "TA" and that with a negative azimuth angle, "recording track B" or "TB"). The digital video data for one field is recorded on the magnetic tape 1 using three segments, or six tracks T1A, T2B, T3A, T4B, T5A, and T6B, as shown in FIG. 2.

At the respective ends of each of recording tracks TA, TB of the tape 1, audio areas ARA1 and ARA2 at one end, and ARA3 and ARA4 at the other end are provided at which the digital audio data is recorded.

Figures 3, 4:
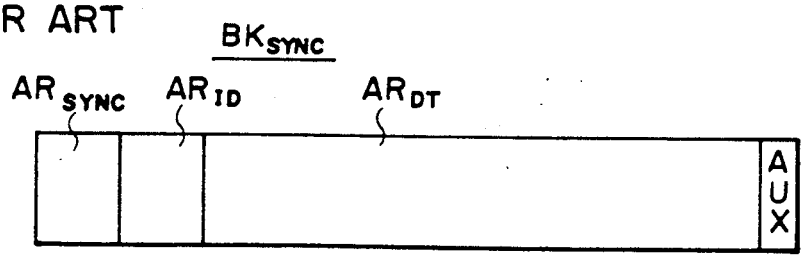
FIG. 3 is a table used for explaining a technique for double recording digital audio data.
FIG. 4 shows a data pattern of a block of the digital audio data.

Referring to FIGS. 2 and 3, four channels of digital audio data are divided and recorded in the audio areas ARA1 to ARA4. For one field period the digital audio data of each channel are compressed along the time base and divided into three divisions. These divisions are recorded twice at different locations in the audio areas ARA1 to ARA4 as shown in FIG. 3. More particularly, digital audio data CH1$a$, CH1$b$, CH1$c$ of a first channel and digital audio data CH2$a$, CH2$b$, CH2$c$ of a second channel are recorded in the audio areas ARA1 and ARA2 respectively of the recording tracks A T3A-1, T5A-1, T1A-2 and additionally are recorded in the audio areas ARA3 and ARA4, respectively, of the tracks preceding the above tracks by one track, i.e., the recording tracks B T2B-1, T-4B1, T-6B1.

Similarly, digital audio data CH3$a$, CH3$b$, CH3$c$ of a third channel and CH4$a$, CH4$b$, CH4$c$ of a fourth channel are recorded in the audio areas ARA1 and ARA2 respectively, of the recording tracks B T4B-1, T6B-1, T2B-2 and in the audio areas ARA3 and ARA4, respectively, of the tracks preceding the above tracks by three tracks, i.e., the recording tracks A T1A-1, T3A-1, T5A-1.

By recording each channel twice, i.e., both in the record areas ARA1, ARA2 at the scan starting end and in the record areas ARA3 and ARA4 at the scan finishing end of the magnetic tape 1, a reliable reproduction is obtained. Even when a scratch or the like is formed at a part of the magnetic tape 1 making it difficult to reproduce the digital audio data from that part, the data on the side free from the scratch or other flaw may be used so that the reliability of the audio signal can be greatly enhanced.

As described above, the sampling frequency of the audio signal is set for example to 48 kHz in accordance with standards for interfacing with other audio equipment and therefore one field thereof in the NTSC system of standards has a frequency of 60/1.001 (=59.94) Hz. Hence, the number of samples in one field period becomes 48 kHz/59.94 Hz = 800.8, which is not an integer.

The number of samples of the audio data recorded in one field, therefore, is set to 801 samples for the 1st to 4th fields and is set to 800 samples for the 5th field. For the 15 segments making up the five fields, 267 samples are allocated to each of the 1st to 14th segments and 266 samples are allocated to the 15th segment. Thus, the 4004 samples are recorded during every 5-field period (i.e., 15-segment period), with such a period treated as a cyclic set of periods.

In each of the audio areas ARA1, ARA2, ARA3, and ARA4, six sync blocks $BK_{SYNC}$, are included, each consisting of a sync area $AR_{SYNC}$, an ID area $AR_{ID}$, and a data area $AR_{DT}$ as shown in FIG. 4. The respective data areas $AR_{DT}$ of the six sync blocks each include digital audio data of one channel for one segment.

In the respective ID areas $AR_{ID}$ of each sync block $BK_{SYNC}$, a field ID $F_{ID}$ is recorded having a value "0"–"4" which is representative of five kinds of field numbers within one cyclic set of periods for recording the 4004 samples of digital audio data. Also recorded in the respective ID areas is a segment ID $S_{ID}$ of value "0"–"2" which is representative of three kinds of segment numbers in each field. Further, in an AUX DATA portion within each data area $AR_{DT}$ is recorded a sample number identification flag indicating, when its value is "0", that 267 samples of digital audio data are recorded in the segment and, when conversely its value is "1", that 266 samples of digital audio data are recorded in the segment.

The reproducing circuit system in a D-VTR refers to the sample number identification flag recorded in the ID area $AR_{ID}$ of each sync block $BK_{SYNC}$. When the sample number identification flag is of value "0", it outputs 267 samples of the digital audio data for the segment. Conversely, when the sample number identification flag is of value "1", it outputs 266 samples of digital audio data for the segment. And accordingly, the number of output samples of the digital audio data is controlled.

In such a reproducing circuit system where the number of output samples of the digital audio data is controlled by simple reference to the sample number identification flag recorded in the ID area $AR_{ID}$ of each sync block $BK_{SYNC}$, there has been a problem that the number of output samples of the digital audio data becomes uncontrollable when an error occurs at the time of reproduction in the sample number identification flag.

An embodiment of the system for recording and reproducing digital audio signals of the present invention is described below in detail with reference to the accompanying drawings.

Figure 5:
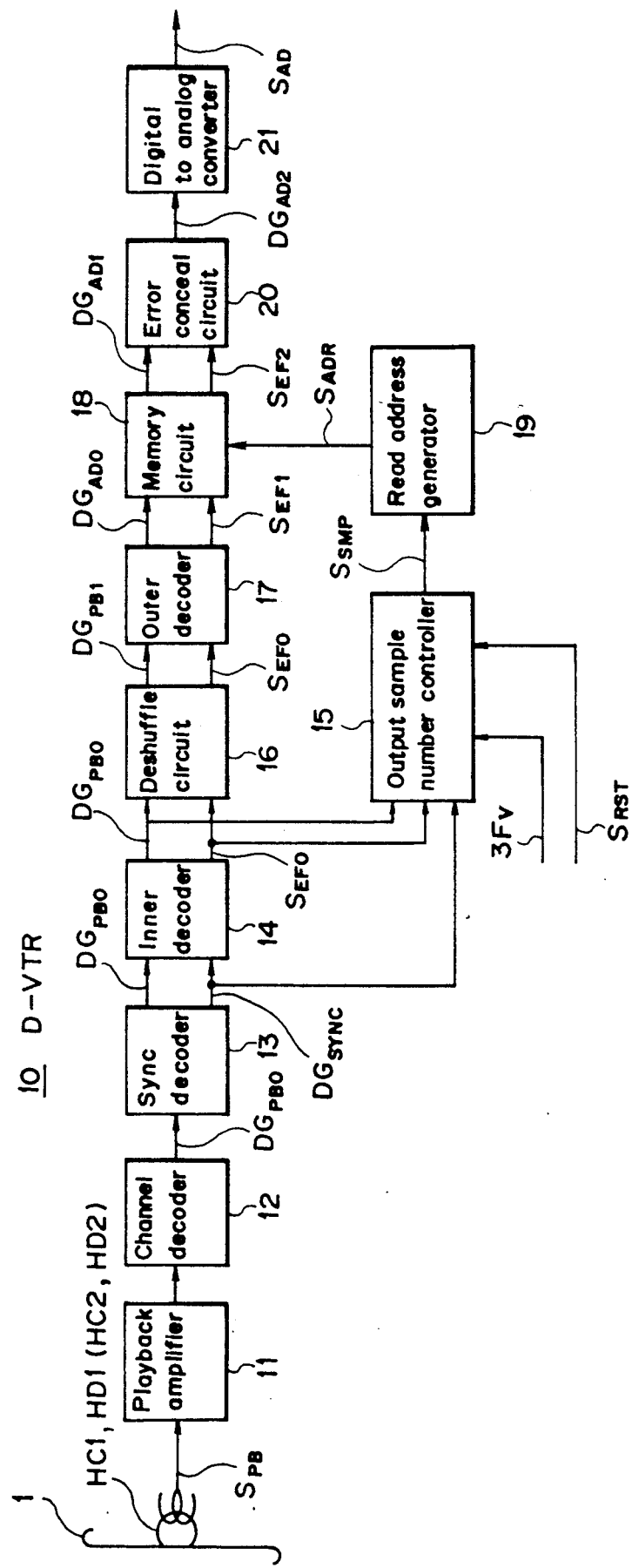
FIG. 5 shows a block diagram of an embodiment of a digital audio data reproducing system according to the invention.

Referring to FIG. 5, reference numeral 10 denotes the reproducing circuit system of digital audio data within a digital video tape recorder (D-VTR); a in which a reproduced RF signal $S_{PB}$ is read out from a magnetic tape 1 by playback heads HC1, HD1 (HC2, HD2) and input through a playback amplifier 11 to a channel decoder 12 to be demodulated. The output of the decoder is a reproduced digital data $DG_{PB0}$ which is input to a sync decoder 13.

In the sync decoder 13, the sync area $AR_{SYNC}$ of each sync block $BK_{SYNC}$ (see FIG. 4) of the reproduced digital data $DG_{PB0}$ is decoded to obtain reproduced sync data $DG_{SYNC}$. The reproduced sync data $DG_{SYNC}$ is supplied to an inner decoder 14, together with the reproduced digital data $DG_{PB0}$. The reproduced sync data $DG_{SYNC}$ also is delivered to an output sample number controller 15.

In the inner decoder 14, the ID area $AR_{ID}$ of each sync block $BK_{SYNC}$ of the reproduced digital data $DG_{PB0}$ is decoded and a reproduced error flag $S_{EF0}$ is formed from error information detected at the time of the decoding. This reproduced error flag $S_{EF0}$ together with the reproduced digital data $DG_{PB0}$ are supplied to a deshuffle circuit 16 in the next stage as well as to the output sample number controller 15.

In the deshuffle circuit 16, the reproduced digital data $DG_{PB0}$ is deshuffled and then input as reproduced digital data $DG_{PB1}$ to an outer decoder 17 together with the reproduced error flag $S_{EF0}$. In the outer decoder 17 the data area $AR_{DT}$ of each sync block $BK_{SYNC}$ is decoded to obtain a digital audio data $DG_{AD0}$. Error information also is obtained at the time of the decoding and is added to the reproduced error flag $S_{EF0}$ to form a reproduced error flag $S_{EF1}$. This reproduced error flag $S_{EF1}$ together with the digital audio data $DG_{AD0}$ are temporarily written into a memory circuit 18 formed of a RAM (random access memory).

The digital audio data $DG_{AD0}$ and the reproduced error flag $S_{EF1}$ written in the memory circuit 18 are read out as digital audio data $DG_{AD1}$ and a reproduced error flag $S_{EF2}$, based on an address control signal $S_{ADR}$ obtained from a read address generator 19. The read address generator 19 generates the read address for accessing the RAM in response to a sample number control signal $S_{SMP}$ delivered from the output sample number controller 15. The digital audio data $DG_{AD1}$ and the reproduced error flag $S_{EF2}$ are supplied to a succeeding error conceal circuit 20.

In the error conceal circuit 20, errors in the digital audio data $DG_{AD1}$ are corrected based on the reproduced error flag $S_{EF2}$ to generate a digital audio data $DG_{AD2}$. This digital audio data $DG_{AD2}$ is converted from digital form into analog form in a digital-to-analog converter 21. The thus reproduced audio signal $S_{AD}$ is delivered to an audio signal processing circuit system (not shown). As described, digital audio data recorded on the magnetic tape 1 together with digital video data is reproduced to obtain the reproduced audio signal $S_{AD}$.

In the prior art system the sample number identification flag is recorded in the AUX DATA portion within the data area $AR_{DT}$ of each sync block $BK_{SYNC}$ and referred to for controlling the number of samples of the digital audio data. In the present embodiment, the output sample number control signal $S_{SMP}$ is formed in the output sample number controller 15 based on the field ID $F_{ID}$ and segment ID $S_{ID}$ included in the ID area $AR_{ID}$ of each sync block $BK_{SYNC}$. The read address generator 19 generates the address control signal $S_{ADR}$ according to the sample number control signal $S_{SMP}$ to control the number of samples of the digital audio data.

Figure 6:
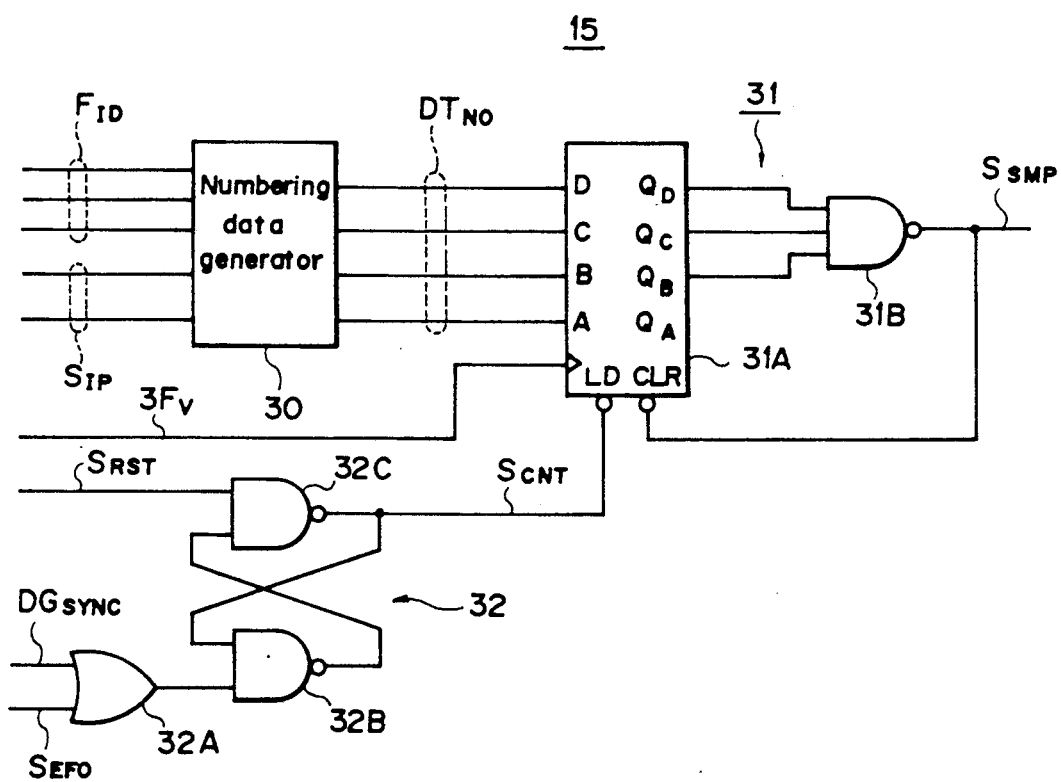
FIG. 6 shows an embodiment of a circuit for controlling the number of output samples of the digital audio data.

The output sample number controller 15, as shown in FIG. 6, includes a numbering data generator 30 made up of a ROM table for generating data for cyclically numbering the segments on the magnetic tape 1 from "0" to "14" based on the field ID $F_{ID}$ and the segment ID $S_D$ decoded in the inner decoder 14. Also included is a counting circuit 31 and a counter controller 32. The counting circuit 31 is of a four-bit counter structure for receiving numbering data $DT_{N0}$ from the numbering data generator 30 at its preset inputs A, B, C, and D and for outputting the output sample number control signal $S_{SMP}$, which has logical "L" level when the count value becomes "14". The counter controller 32 is for controlling the presetting of the numbering data $DT_{N0}$ in the counting circuit 31 based on the reproduced sync data $DG_{SYNC}$ obtained from the sync decoder 13 and the reproduced error flag $S_{EF0}$ obtained from the inner decoder 14.

The numbering data generator 30 receives a combination of the field ID $F_{ID}$ and the segment ID $S_{ID}$ decoded in the inner decoder 14 as a read address to access the ROM. As a result the contents previously written in the ROM at the address corresponding to the field ID $F_{ID}$ and segment ID $S_{ID}$ as shown in FIG. 7 are read out as numbering data $DT_{N0}$ and delivered to the counting circuit 31.

The clock terminal of the counter 31A of the couting circuit 31 is supplied with a reference clock 3Fv which goes high three times in one field period of the video data.

Three high-order bits $Q_B$, $Q_C$, $Q_D$ of four-bit outputs $Q_A$, $Q_B$, $Q_C$, $Q_D$ are delivered to a NAND gate circuit 31B. The output sample number control signal $S_{SMP}$ is output from the NAND gate circuit 31B having a logical level "L" when the count value of the counter 31A is "14" or above. Further, the output sample number control signal $S_{SMP}$ is inverted and input to the clear input CLR of the counter 31A to initialize the inner count value to "0". Thus, the counting circuit 31 as a whole constitutes a divide-by-15 counter.

The counter controller 32 is formed of an OR gate circuit 32A, and a first and a second NAND gate 32B and 32C. The reproduced sync data $DG_{SYNC}$ obtained from the sync decoder 13 and the reproduced error flag $S_{EF0}$ obtained from the inner decoder 14 are input to the OR gate 32A.

The logical output of the OR gate circuit 32A together with the logical output of the second NAND gate circuit 32C are input to the first NAND gate circuit 32B. The logical output therefrom together with a reset signal $S_{RST}$, which goes from logical "H" level to logical "L" level delayed by a predetermined length of time at the timing of the rise of the reference clock 3Fv, are input to the second NAND gate circuit 32C. The logical output of the second NAND gate circuit 32C. Counter control signal $S_{CNT}$, is inverted and input to the load terminal LD of the counter 31A.

When the reproduced sync data $DG_{SYNC}$ is obtained normally and the field ID $F_{ID}$ and the segment ID $S_{ID}$ are free from errors upon reference to the reproduced error flag $S_{EF0}$, the counter controller 32 supplies the counter 31A with the counter control signal $S_{CNT}$ to enable the counter 31A to become loadable. However, when the reproduced sync data $DG_{SYNC}$ is not obtained normally or the field ID $F_{ID}$ or the segment ID $S_{ID}$ contains an error even if the reproduced sync data $DG_{SYNC}$ is obtained normally, the counter control signal $S_{CNT}$ puts the counter 31A into a load inhibited state.

When the reproduced sync data $DG_{SYNC}$ is obtained normally and the field ID $F_{ID}$ and the segment ID $S_{ID}$ are free from errors, the counting circuit 31 presets the numbering data $DT_{N0}$ incoming from the numbering data generator 30 sequentially at the timing of the rise of the reference clock 3Fv, as its inner count value, and then outputs the data. However, when the reproduced sync data $DG_{SYNC}$ is not obtained normally or the field ID $F_{ID}$ or the segment ID $S_{ID}$ contains an error even if the reproduced sync data $DG_{SYNC}$ is obtained normally, the counting circuit 31 performs sequential upward counting at the timing of the rise of the reference clock 3Fv and outputs the upward counted value.

In the described manner, once the reproduced sync data $DG_{SYNC}$ is normally obtained and the field ID $F_{ID}$ and the segment ID $S_{ID}$ are found free from errors, the output sample number controller 15, (even if the reproduced sync data DG$_{SYNC}$ thereafter is not normally obtained or an error is detected in the field ID F$_{ID}$ and the segment ID S$_{ID}$) reads out the output sample number control signal S$_{SMP}$. The control signal S$_{SMP}$ corresponds to each segment on the magnetic tape 1 and goes on to "L" level when it corresponds to the 15th segment based on the field ID F$_{ID}$ and the segment ID S$_{ID}$ and delivers the signal to the address generator 19.

Thus, the address generator 19, when the output sample number control signal S$_{SMP}$ is at "H" level, outputs the address control signal S$_{ADR}$ to read 267 samples to the memory circuit 18. Conversely, when the output sample number control signal S$_{SMP}$ is at "L" level, it outputs the address control signal S$_{ADR}$ to read 266 samples to the memory circuit 18. Thereby, the output sample number of the digital audio data can be controlled to be correct at all times.

In reproducing digital audio data on the magnetic tape, phases of the 15 segments on the magnetic tape are detected by the use of the field ID and the segment ID. The phases of the 15 segments are loaded into the divide-by-15 counter only when the field ID and segment ID are correctly reproduced. The divide-by-15 counter is allowed to count upward, however, when the field ID and the segment ID contain an error using the reference clock corresponding to the segment on the magnetic tape; and thus, it is possible to detect the segment in which digital audio data of a different sample number is recorded even when the field ID and the segment ID contain an error. Thus, a D-VTR is achieved which is capable of determining the correct number of output samples at all times.

According to the present invention as described above, a digital audio signal reproducing system, for reading on a recording medium such a PCM audio signal is provided for digitizing an audio signal according to a sampling frequency in a specific relationship with the unit period of a video signal, dividing the digitized signal into specific plural blocks and encoding each block for error correction. Identification information is attached for identifying the specific block along with a synchronization signal. The PCM audio signal is decoded by means of a decoder for performing the error correction. A memory is used for reconstructing the decoded signal to reproduce the original digital audio signal. The memory is adapted such that, when the identification signal reproduced is correct, numbering data corresponding to each block of the plural blocks synchronized with the unit period of the video signal and the sampling frequency are delivered based on the identification signal to a counting circuit as preset data. When an error is detected in the reproduced identification signal, the preset data is inhibited from being loaded into the counting circuit but a clock having a period corresponding to the unit period of the video signal is counted up to a maximum of the number of the plural blocks, whereby the numerical sequence of each block of the plural blocks synchronized with the sampling frequency can be correctly detected based on the count output obtained from the counting circuit. Thus the number of samples of the original digital audio signal taken out at the time when the same is read out of the memory can be controlled to be in accordance with the number of samples of each block of the plural blocks.

Although the embodiment was described above as to the case where the present invention was applied to a D-VTR having the format in which digital audio data for one field is divided into three segments and recorded along six tracks, the present invention is not limited to such a case. It can be applied, for example, to a D-VTR having a format in which digital audio data for one field is divided into two segments and recorded along four tracks or to other D-VTRs having other formats.

When the present invention is applied to a D-VTR having the format in which digital audio data for one field is divided into two segments, the same effect as obtained in the above described embodiment can be obtained by forming the counting circuit of the output sample number controller of a divide-by-10 counter, or decade counter, instead of the divide-by-15 counter. The counter is arranged such that an output sample number control signal having a different logical level is output at the phase corresponding to the segment with the different sample number.

Although, in the above described embodiment, the present invention was applied to the D-VTR having the format to perform double recording of the digital audio data on the magnetic tape, the present invention is not limited to such a format but can be applied to a D-VTR having a format to record the digital audio data only once.

Further, although the above embodiment was described as to the case where the present invention was applied to a digital video tape recorder (D-VTR), the present invention is not limited to such case but is suitable for use in a variety of digital audio signal processing systems for reproducing data from other recording media such as an optical disk with digital video data and digital audio data recorded thereon.

What is claimed is:

1. A system for reproducing digital audio data from a recording medium on which said digital audio data are recorded with video data, said digital audio data being rearranged from an original data format to a plurality of segments thereof as recorded on said recording medium, wherein L segments of said digital audio data correspond to one field of said video data (where L is an integer at least equal to 1), each of said segments including plural samples of said digital audio data, the number of said samples in segments corresponding to each said field of M fields out of N fields being different from the number of samples in at least one of the segments corresponding to the remaining N - M fields (where M and N are integers and N is greater than M), each of said segments further including identification data indicating field numbers 1 through N to which each said segment corresponds, said system comprising:

means for detecting said identification data in each segment of said digital audio data;

means for detecting an error in said identification data;

means for deriving from said identification data numbering data 1 through the product of the number of segment L and the number of fields N, said numbering data indicating the sequence of each said segment in a set of said N fields;

means for providing a clock signal having a period corresponding to one of said segments;

means for detecting the presence of an error in said identification data;

counter means into which said numbering data derived from said identification data is loaded when no error is detected in said identification data and which counts said clock signal when an error is detected in said identification data; and means for reconstructing said digital audio data in said original data format in response to an output of said counter means.

2. A system for reproducing digital audio data according to claim 1, wherein said means for reconstructing said digital audio data is operative to reconstruct said digital audio data in the original data format from a plurality of segments each being recorded twice at different portions of said recording medium.

3. A system for reproducing digital audio data according to claim 1, wherein one field of said video data corresponds to at least two segments of said digital audio data, each segment including second identification data indicating segment numbers within one said field, and wherein said means for detecting said identification data is operative to detect said second identification data.

4. A system for reproducing digital audio data according to claim 1, wherein the number of said samples in one field out of said N fields is different from that of each of remaining N−1 fields.

5. A system for reproducing digital audio data according to claim 4, wherein one field of said video data corresponds to at least two segments of said digital audio data and only one segment out of all segments within said N fields has a different number of said samples of said digital audio data.

6. A system for reproducing digital audio data according to claim 1, wherein said counter means is a divide-by-LN counter.

7. A system for recording and reproducing digital audio data and video data on a recording medium, comprising:

recording means for recording said digital audio data together with said video data on the recording medium, said digital audio data being rearranged from an original data format to a plurality of segments each including plural samples of said digital audio data so that one field of said video data corresponds to L segments of said digital audio data (where L is an integer at least equal to 1), the number of said samples in segments corresponding to each said field of M fields out of N fields being different from the number of samples in at least one of the segments corresponding to the remaining N - M fields (where M and N are integers and N is greater than M), each of said segments including identification data indicating field numbers 1 through N to which each said segment corresponds;

means for reproducing said digital audio data from said recording medium;

means for detecting said identification data in each said segment of said digital audio data;

means for detecting an error in said identification data;

means for deriving from the detected identification data numbering data 1 through the product L times N, said numbering data indicating the sequence of each said segment in a set of said N fields;

means for providing a clock signal having a period corresponding to one of said segments;

means for detecting the presence of an error in said identification data;

counter means into which said numbering data derived from said identification data is loaded when no error is detected in said identification data and which counts said clock signal when an error is detected in said identification data; and means for reconstructing said digital audio data in said original data format in response to an output of said counter means.

8. A system for recording and reproducing digital audio data according to claim 7, wherein said recording means is operative to record each segment of said digital audio data twice at different portions of said recording medium.

9. A system for recording and reproducing digital audio data according to claim 7, wherein said recording means is operative to record at least two segments of said digital audio data with each field of said video data, each segment including second identification data indicating segment numbers within a respective field.

10. A system for recording and reproducing digital audio data according to claim 7, wherein the number of said samples in one field out of each said set of N fields is different from that of each of the remaining N−1 fields in the respective set.

11. A system for recording and reproducing digital audio data according to claim 10, wherein one field of said video data corresponds to at least two segments of said digital audio data and only one segment out of all segments within said N fields has a different number of said samples of said digital audio data.

12. A system for recording and reproducing digital audio data according to claim 7, wherein said counter means is a divide-by-LN counter.

* * * * *